Patented Jan. 15, 1929.

1,699,350

UNITED STATES PATENT OFFICE.

LIONEL H. DUSCHAK, OF SAN FRANCISCO, CALIFORNIA, ASSIGNOR TO OLIVER CONTINUOUS FILTER COMPANY, OF OAKLAND, CALIFORNIA, A CORPORATION OF CALIFORNIA.

METHOD OF SEPARATING PRECIOUS METALS AND COPPER FROM CYANIDE SOLUTION.

No Drawing. Application filed October 1, 1925. Serial No. 59,813.

This method relates to the separate precipitation of precious metals and copper from cyanide solutions, and its object is to provide for the recovery of the precious metals and copper in as pure forms as possible, without the necessity of extended subsequent treatment of a base bullion, which treatment is necessary where the precious metals and copper are separated from the solution in one operation.

It will be understood by those skilled in the art, that in the treatment of copper-bearing precious metal ores by the cyanide process, that considerable difficulty is caused by the copper which is dissolved in the cyanide solution. When zinc is the precipitant used for the precious metals the copper also precipitates on the zinc, and renders it ineffective, or less effective, as a precipitant for the precious metals, thereby reducing the capacity of the apparatus as well as using up the precipitating agent needlessly and wasting cyanide; and to avoid a loss of cyanide the copper must be precipitated to release cyanide for further use in leaching the ore.

Either zinc dust or zinc shavings are commonly used as the precipitating agent, and as the copper precipitates with the precious metals, the resulting bullion is low grade, and it becomes necessary to refine, at considerable expense, this low grade bullion. It would obviously be less expensive to be able to precipitate the precious metals and copper separately, for then each could be smelted with little loss.

I have found that by the use of an amalgam containing one or more metals, such as sodium or zinc, that the precious metals and copper can be separately precipitated, provided the inherent properties of precipitation of the precious metals and copper are considered.

I have discovered that the rate of precipitation of the precious metals from the cyanide solution with the use of such amalgams, is many times greater than the rate of precipitation of copper, and that the presence of copper in the cyanide solution does not interfere either with the rate or completeness of precipitation of the precious metals.

Therefore in carrying out this process the cyanide solution containing preciou metals, and the copper is first brought into contact for a short period with an amalgam such as zinc or sodium with mercury which contact is continued only long enough to remove the largest part of the gold and silver. Thereafter this solution is brought into contact with another body of amalgam of the same kind for a longer period to precipitate the largest part of the copper, any metal amalgam capable of precipitating precious metals from cyanide solution in the way disclosed herein may be used for the present precipitation purpose.

The cyanide solution, after the precipitation of the precious metals and before the addition of any fresh cyanide to the solution to bring it up to the desired standard, is then subjected to a considerably longer contact with a separate portion of amalgam with which the copper is precipitated.

The cyanide solution from which the precious metals and copper have been removed, is now available for use in treating a new lot of ore with the same advantage as to the regeneration of the sodium or potassium solution, as if the several metals were precipitated by such amalgam at one time.

The time required for carrying out the two stages of precipitation will depend upon the way in which the pregnant solution and amalgam are brought into contact with one another, but it may be stated that the time needed for the precipitation of the precious metals will be from one-tenth to one-twentieth of the time required for the precipitation of the copper.

It will be understood that the treatment of ore by the cyanide process is essentially a cyclic operation, the steps of which are as follows:

First: Leaching of the ore.

Second: Precipitation of the values from, the pregnant solution, and then using the barren solution for repetition of the process.

Whatever copper may be dissolved, may either be all precipitated each time or may be allowed to accumulate in the solution if its content is not too great, through several precious metal precipitations. Ordinarily a balanced operation will be found convenient, the copper precipitating circuit being proportioned to the main circuit in such a way that all of the copper will be removed in one place, while all of the precious metals are removed from the solution in another place. This method makes it possible to treat considerable tonnages of copper-bearing precious metal ores, which cannot be successfully treated ordinarily.

Experiments shows that to carry out this process the amalgam used must be electropositive with respect to copper. It is of course understood that all amalgams contain a certain percentage of mercury as one of the constituents thereof.

What I claim is as follows, but modifications may be made in the above particular described form of the invention within the purview thereof:

A method of precipitating precious metals and copper from cyanide solutions which consists in treating the solution with an amalgam containing a metal electro positive to copper for a short period to remove the precious metals therefrom, and thereafter treating the solution with a separate portion of an amalgam of the same character for a longer period to remove the copper and reusing the treated solution to treat a fresh quantity of ore.

In testimony whereof I have hereunto set my hand this 29th day of August, A. D. 1925.

LIONEL H. DUSCHAK.